Sept. 28, 1971  H. ETTISCHER ET AL  3,608,459
RELEASE BLOCKING DEVICE FOR PHOTOGRAPHIC CAMERAS
Filed Nov. 21, 1968  2 Sheets-Sheet 1
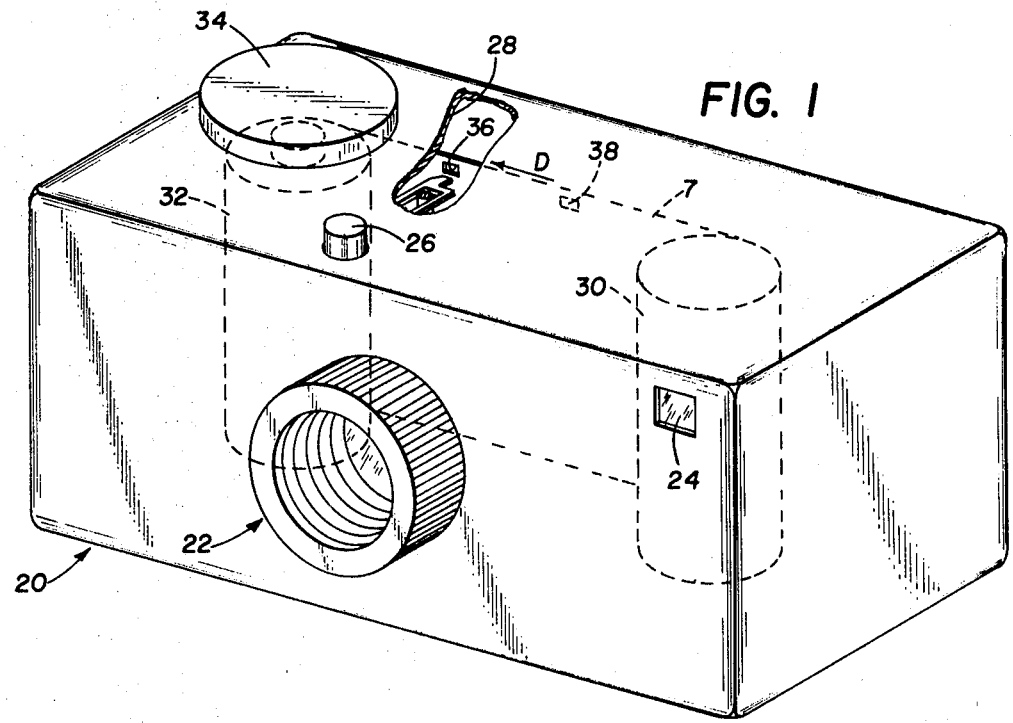
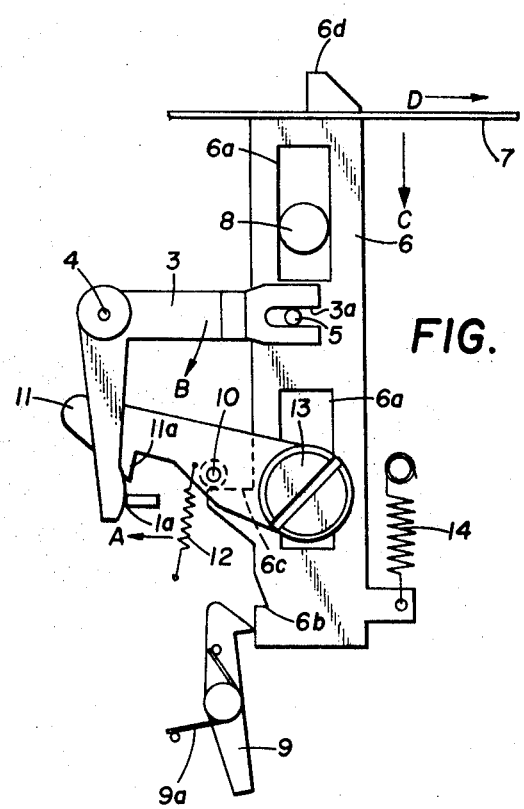
HELMUT ETTISCHER
ALFRED TRUMPP
INVENTORS
BY James J. Wood
R. H. Hampton
ATTORNEYS United States Patent Office 3,608,459
Patented Sept. 28, 1971

3,608,459
RELEASE BLOCKING DEVICE FOR PHOTOGRAPHIC CAMERAS
Helmut Ettischer, Ruit, Kreis Esslingen, and Alfred Trumpp, Stuttgart-Hedelfingen, Germany, assignors to Eastman Kodak Company, Rochester, N.Y.
Filed Nov. 21, 1968, Ser. No. 777,730
Claims priority, application Germany, Dec. 8, 1967, K 59,652
Int. Cl. G03b *19/04*
U.S. Cl. 95—31FL          5 Claims

ABSTRACT OF THE DISCLOSURE

A release blocking device for photographic cameras or the like, in which a photographic film strip, perforated at predetermined intervals, is advanced stepwise along a predetermined path. A scanning member is arranged to engage and disengage successive perforations on the photographic film. At or during shutter actuation, the scanning member becomes disengaged from a perforation, thus permitting film transport to take place. At the same time, the scanning member releases a catch member for movement to a position in which it holds the shutter release in a locked position. Near the end of film transport, the scanning member is released toward the film whereupon, when it snaps into a succeeding perforation, the catch member is deactivated to unlock the shutter release.

BACKGROUND OF THE INVENTION

(1) Field of the invention

This invention relates to photographic cameras, and more specifically to a release blocking device for preventing shutter release until the photographic film feeding operation has been completed.

(2) Description of the prior art

The present invention relates to a release blocking device for photographic cameras comprising means for feeding a film strip, perforated at predetermined intervals, stepwise along a predetermined path, said means comprising a film driving gear and a scanning member which is designed to snap into a perforation on the film strip, thus to block the film motion.

Similar release blocking devices of diverse types have been known in the art. Their design provides for the required subsequent operations to be initiated following or during the operation of the camera release, either from the shutter through the movement of components associated with the latter, or through several inclined planes of a slide moving in the traveling direction of the film.

In the first instance, additional transfer elements are indispensable; in the second instance the functions both of the inclined planes and the parts sliding along said planes must be exactly coordinated—requirements, which in both cases make the design more complex and more expensive.

The present invention is intended to provide a particularly simple, small-size and, nevertheless, reliable blocking device performing the functions both of blocking and of releasing the camera shutter release in a simple manner through an interplay between a scanning member and the release, with the aid of only one lever each as the transfer element.

SUMMARY OF THE INVENTION

The present invention relates to a blocking device for a photographic camera. Photographic film, perforated at predetermined intervals, is fed along a predetermined path. A scanning means is arranged to engage and disengage the successive perforations on the film. During or after the actuation of the camera shutter, the scanning means becomes disengaged from a perforation and is displaced toward a locked position to enable film transport. During this displacement the scanning means releases a catch means to release the latter to a position in which it holds the shutter release means in a blocked position. Near the completion of film transport, the scanning means is unlocked and it proceeds toward the traveling photographic film. Upon engaging a perforation, the catch means is deactivated, thereby unblocking the shutter release means.

Accordingly it is an object of the present invention to provide a particularly simple, small-size and reliable release blocking device to insure against spurious shutter actuation.

The novel features of the invention are set forth with particularity in the appended claims, the invention itself, however, both as to its organization and method of operation together with further objects and advantages thereof, may best be understood by reference to the description to follow considered in connection with the accompanying drawings.

BRIEF DESCRIPTION OF THE DRAWINGS

FIG. 1 is a pictorial view of a photographic camera, partially broken away, showing the release blocking device in accordance with the instant invention;

FIG. 2 shows the release blocking device in accordance with the instant invention, with the shutter release catch means in its unblocked position;

DESCRIPTION OF THE PREFERRED EMBODIMENT

Figure 3:
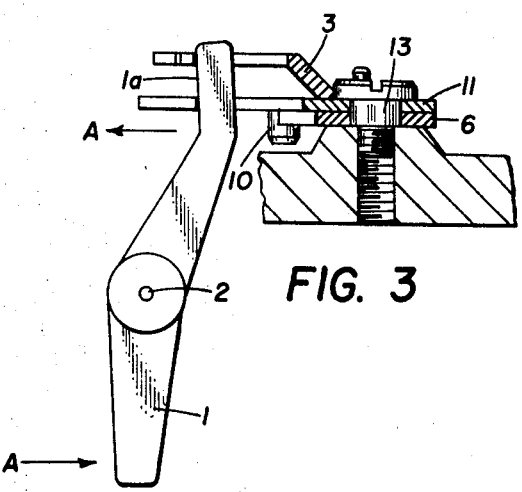
FIG. 3 is a partial cross-sectional view of the device shown in FIG. 2 with added details of the shutter lever release mechanism.

Before proceeding with the detailed description of the release blocking device of the instant invention, it will be helpful to briefly describe the environment in which the mechanism is intended to operate.

Referring now to FIG. 1, a photographic camera is indicated generally at 20. The principal parts of the camera are the objective lens 22, the viewfinder 24, the shutter release button 26. The camera is partially broken away at 28 to show the release blocking device in FIGS. 2, 3 and 4, cooperating with photographic film 7. The film 7 is unwound from a supply spool 30 to a take-up spool 32 by any convenient film advancing means, here illustrated as a manually operated knob 34, the film 7 moving in the direction indicated by the arrow identified at D. The film 7 contains a number of slotted apertures or perforations, two of which are indicated for illustrative purposes at 36 and 38, the release blocking device cooperating with these perforations in a manner which will presently be made clear.

Figure 4:
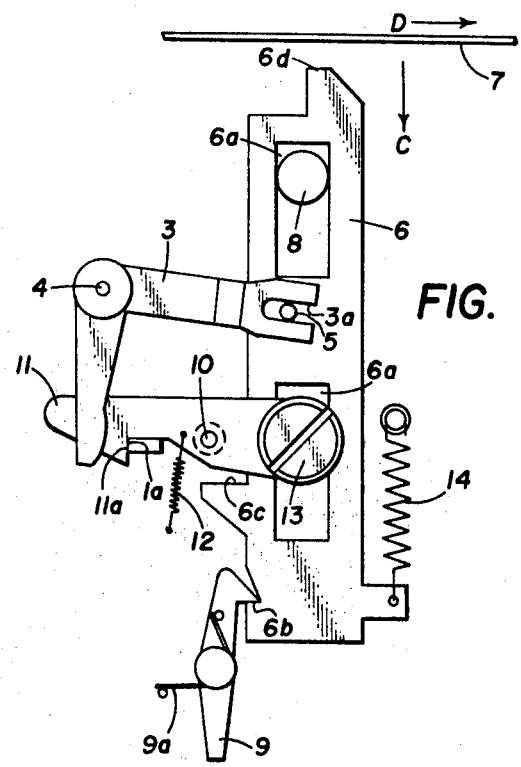
FIG. 4 shows the release blocking device of the instant invention in its release condition, showing the shutter release catch means in a blocked position.

FIGS. 2 and 3 show the release blocking device in condition to be released or unlocked. Upon actuation of the shutter release button 26 mounted on the camera, release lever 1 (FIG. 3) is rotated in the direction indicated by the arrows A about the axis 2, causing the plane face 1a of release lever 1 to rotate the intermediate lever 3 in the direction indicated by arrow B about axis 4; this causes the slot and pin connection 3a, 5 to displace scanning or slide means 6 out of a perforation on the film 7 and in the direction indicated by arrow C. The scanning or slide means 6 is displaced within the alignments 6a, 8;

6a, 13 until scanning or slide catch means 9 snaps into locking engagement with notch 6b of the slide 6 (FIG. 4).

During this operation, projection 6c releases shutter release catch means 11 by its disengagement with pin 10, and shutter release catch means 11 is now free to pivot counterclockwise about the mounting screw 13 under the discipline of spring 12, thus bringing the locking plane face 11a of shutter release catch means 11 within the reach of release lever 1. When the shutter release button 26 has been released, release lever 1 (FIG. 2) is returned to its original position by means not shown on the drawing, and as shown in FIG. 4, the blocking plane face 11a of release catch means 11 drops behind face 1a of release lever 1, thus blocking release lever 1, and preventing, for the time being, any further operation of the shutter release button 26.

When the camera and shutter mechanisms are reset, release lever 1 initially remains blocked (FIG. 4) in order to prevent operating errors, until during the latter phase of the resetting process, when gear members (not shown in the drawing) swing scanning or slide catch means 9 out of notch 6b of scanning or slide means 6 against the action of the spring 9a; this now permits the scanning or slide means 6 to respond to the tensive force of spring 14 and to move its front end 6d against the film 7, which is moving in the direction indicated by the arrow D. In this position, shutter release catch means 11 still blocks release lever 1. The projection 6c lifts blocking catch means 11 out of the engagement with the release lever 1 only when the next slotted aperture or perforation slides by, that is, when the slide 6 snaps into a perforation (such as 36 or 38 in FIG. 1) and arrests the feeding mechanism in a known manner and by means not shown in the drawing; the camera is again ready to be actuated.

The instant invention also insures that the shutter release catch means 11 remains within the discipline of release lever 1 while the film trailers are being transported, that is, unwanted release during such transportation procedure is precluded. Accordingly, erroneous actuation of the shutter release and thus defective shots are positively prevented within these limits, even if the identifying marks appearing in the rear window of the camera are disregarded.

It is also within the scope of the instant invention to provide for an eccentric, i.e. adjustable design of the guide pin 5 of pin and slot guide 5, 3a which is mounted on scanning or slide means 6 and/or pin 10 at shutter release catch means 11.

The invention has been described in detail with particular reference to preferred embodiments thereof, but it will be understood that variations and modifications can be effected within the spirit and scope of the invention.

We claim:

1. In a release blocking device for photographic cameras of the type having means for advancing along a predetermined path photographic film perforated at spaced intervals, and including camera shutter release means movable between a rest position wherein the shutter blades are closed, and an actuated position wherein the shutter blades have been opened to enable photographic exposure, the improvement comprising:
   (a) scanning means for engaging successive perforations on the film, said means being arranged for rectilinear displacement in a path generally normal to the predetermined film path, and having unlocked and locked conditions, said scanning means being biased towards the film path and being movable towards the film path when in the unlocked condition;
   (b) release means mechanically coupled to said scanning means and to said camera shutter release means, said release means being displaceable in response to the movement of said camera shutter release means into said actuated position to disengage said scanning means from a film perforation to permit film advancement;
   (c) first catch means adapted for movement to a position to engage said camera shutter release means in response to the displacement of said scanning means away from said film path, for releasably holding said camera shutter release means in said actuated position; and
   (d) second catch means positioned in the displacement path of said scanning means, for releasably holding said scanning means in said locked condition out of engagement with a film perforation in response to the displacement of said scanning means out of said film path, said second catch means releasing said scanning means in response to the advancement of the film by a predetermined amount.

2. Release blocking device according to claim 1 wherein:
   (a) said scanning means comprises slide means having a guide pin mounted thereon; and
   (b) said release means comprising bell crank means slotted at one end for engaging said guide pin and adapted for rotary displacement in response to the movement of said camera shutter release means into said actuated position, said rotary displacement imparting rectilinear displacement to said guide pin.

3. Release blocking device according to claim 2 wherein:
   said guide pin is of eccentric shape and is adjustable.

4. Release blocking device according to claim 1 wherein:
   (a) said scanning means comprises slide means having a projection; and
   (c) said first catch means includes a pin arranged for engagement by said projection when said slide is engaged with a perforation for holding said first catch means out of engagement with said camera shutter release means, said pin becoming disengaged from said projection when said slide becomes disengaged from a perforation to release said first catch means for engagement with said camera shutter release means, to releasably hold said camera shutter release means in said actuated position.

5. In a release blocking device for photographic cameras of the type having means for advancing along a predetermined path photographic film perforated at predetermined spaced intervals, and including camera shutter release means movable between a rest position wherein the shutter blades are closed, and an actuated position wherein the shutter blades have been opened to enable photographic exposure, the improvement comprising:
   (a) slide means having locked and unlocked conditions, and a first pin mounted thereon and arranged for rectilinear displacement in a path approximately normal to the predetermined film path, said slide means being resiliently urged towards said film path when said slide means is in said unlocked condition;
   (b) bell crank means slotted at one end for engaging said first pin and mounted for rotary displacement in response to the movement of said camera shutter means into said actuated position, said first pin being displaced rectilinearly in response to the rotary displacement of said bell crank means to disengage said slide means from a film perforation to permit film advancement;
   (c) first catch means resiliently urged into an active position for releasably locking said camera shutter release means, said first catch means including a second pin arranged for engagement with said slide means for retaining said first catch means in an inactive position when said slide means is engaged with a film perforation, and said second pin being disengaged from said slide means to free said first catch means for movement to the active position when said slide means disengages a film perforation; and
   (d) second catch means positioned in the displacement path of said slide means for releasably holding said slide means in said locked position out of engagement with a film perforation when said slide is moved out of engagement with a film perforation, said second catch means releasing said slide in response to the advancement of the film by a predetermined amount.

References Cited

UNITED STATES PATENTS

| | | | |
|---|---|---|---|
| 1,260,356 | 3/1918 | Folmer | 95—31FSL |
| 1,326,470 | 12/1919 | Terwiel | 95—31FSL |
| 1,331,852 | 2/1920 | Roikjer | 95—31FSL |
| 1,397,132 | 11/1921 | Long | 95—31FSL |
| 1,682,813 | 9/1928 | Thompson | 95—31 |

FOREIGN PATENTS

| | | | |
|---|---|---|---|
| 1,179,457 | 10/1964 | Germany | 95—31FSL |

SAMUEL S. MATTHEWS, Primary Examiner

M. H. HAYES, Assistant Examiner